US007302331B2

(12) United States Patent
Meyers et al.

(10) Patent No.: US 7,302,331 B2
(45) Date of Patent: Nov. 27, 2007

(54) WHEEL LIFT IDENTIFICATION FOR AN AUTOMOTIVE VEHICLE

(75) Inventors: Joseph Carr Meyers, Farmington Hills, MI (US); Todd Allen Brown, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 466 days.

(21) Appl. No.: 10/604,398

(22) Filed: Jul. 17, 2003

(65) Prior Publication Data

US 2004/0111208 A1    Jun. 10, 2004

Related U.S. Application Data

(63) Continuation-in-part of application No. 10/608,909, filed on Jun. 27, 2003.

(60) Provisional application No. 60/401,309, filed on Aug. 5, 2002, provisional application No. 60/401,418, filed on Aug. 5, 2002, provisional application No. 60/400,156, filed on Aug. 1, 2002.

(51) Int. Cl.
*B60T 8/32* (2006.01)
*B60T 8/84* (2006.01)
*B60B 39/00* (2006.01)
*G06F 17/00* (2006.01)

(52) U.S. Cl. .......................... 701/71; 701/38; 701/90; 303/138; 303/163

(58) Field of Classification Search ............. 701/38, 701/71, 70, 69, 78, 74, 90; 340/440; 280/5.507; 303/191, 184, 177, 176, 174, 144, 138, 163; 73/121; 477/183

See application file for complete search history.

(56) References Cited

U.S. PATENT DOCUMENTS 2,917,126 A    12/1959    Phillips (Continued)

FOREIGN PATENT DOCUMENTS

DE          36 16 907         11/1987

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner*—Thomas Black
*Assistant Examiner*—Christine M Behncke
(74) *Attorney, Agent, or Firm*—Gary Smith, Esq.; Dickinson Wright PLLC

(57) ABSTRACT

A roll control system (16) for an automotive vehicle (10) is used to detect if one of the plurality of wheels (12) is lifted. The system generates a pressure request to determine if the wheel has lifted. A roll control pressure request may also be generated. The wheel lift pressure is suppressed in response to the roll control pressure request. The system may also store a peak wheel speed after the initiation of a build cycle so that the peak wheel speed is used in the wheel lift determination. Also, the system may have an ABS monitor mode which uses the build and release cycles of the ABS system to determine whether a wheel has lifted.

20 Claims, 10 Drawing Sheets

U.S. PATENT DOCUMENTS

| | | |
|---|---|---|
| 3,604,273 A | 9/1971 | Kwok et al. |
| 3,608,925 A | 9/1971 | Murphy |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |
| 4,767,588 A | 8/1988 | Ito |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A * | 12/1994 | Akuta et al. ............... 180/197 |
| 5,408,411 A | 4/1995 | Nakamura et al. |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffman |
| 6,002,975 A | 12/1999 | Schiffman et al. |
| 6,026,926 A | 2/2000 | Noro et al. |
| 6,038,495 A | 3/2000 | Schiffman |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 * | 1/2001 | Semsey ..................... 303/7 |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 * | 8/2001 | Schramm et al. ............ 701/72 |
| 6,278,930 B1 | 8/2001 | Yamada et al. |
| 6,282,471 B1 | 8/2001 | Burdock et al. |
| 6,282,472 B1 | 8/2001 | Jones et al. |

| | | | | | |
|---|---|---|---|---|---|
| 6,282,474 B1 | 8/2001 | Chou et al. | DE | 42 27 886 | 2/1994 |
| 6,292,734 B1 | 9/2001 | Murakami et al. | DE | 43 35 979 | 4/1995 |
| 6,292,759 B1 | 9/2001 | Schiffmann | DE | 43 42 732 | 6/1995 |
| 6,311,111 B1 | 10/2001 | Leimbach et al. | DE | 199 07 633 | 10/1999 |
| 6,314,329 B1 | 11/2001 | Madau et al. | DE | 100 46 036 A1 | 3/2002 |
| 6,315,373 B1 * | 11/2001 | Yamada et al. ............. 303/191 | EP | 0 430 813 | 12/1993 |
| 6,321,141 B1 | 11/2001 | Leimbach | EP | 0 662 601 | 7/1995 |
| 6,324,446 B1 | 11/2001 | Brown et al. | EP | 0 758 601 | 2/1997 |
| 6,324,458 B1 | 11/2001 | Takagi et al. | FR | 24 25 342 | 12/1979 |
| 6,330,522 B1 | 12/2001 | Takeuchi | GB | 2257403 | 1/1993 |
| 6,332,104 B1 | 12/2001 | Brown et al. | GB | 2 342 078 | 4/2000 |
| 6,338,012 B2 | 1/2002 | Brown et al. | JP | 62055211 | 9/1985 |
| 6,349,247 B1 * | 2/2002 | Schramm et al. ............. 701/1 | JP | 63116918 | 5/1988 |
| 6,351,694 B1 | 2/2002 | Tseng et al. | JP | 63151539 | 6/1988 |
| 6,352,318 B1 | 3/2002 | Hosomi et al. | JP | 63203456 | 8/1988 |
| 6,356,188 B1 * | 3/2002 | Meyers et al. ............. 340/440 | JP | 1101238 | 4/1989 |
| 6,366,844 B1 * | 4/2002 | Woywod et al. ............. 701/83 | JP | 2171373 | 7/1990 |
| 6,370,938 B1 | 4/2002 | Leimbach et al. | JP | 3042360 | 2/1991 |
| 6,394,240 B1 | 5/2002 | Barwick | JP | 3045452 | 2/1991 |
| 6,397,127 B1 | 5/2002 | Meyers et al. | JP | 4008837 | 1/1992 |
| 6,419,240 B1 | 7/2002 | Burdock et al. | JP | 5016699 | 1/1993 |
| 6,428,118 B1 | 8/2002 | Blosch | JP | 5254406 | 10/1993 |
| 6,438,464 B1 | 8/2002 | Woywod et al. | JP | 6278586 | 10/1994 |
| 6,477,480 B1 | 11/2002 | Tseng et al. | JP | 6297985 | 10/1994 |
| 6,496,758 B2 | 12/2002 | Rhode et al. | JP | 6312612 | 11/1994 |
| 6,496,763 B2 * | 12/2002 | Griessbach ............. 701/45 | JP | 8080825 | 3/1996 |
| 6,498,976 B1 | 12/2002 | Ehlbeck et al. | JP | 9005352 | 1/1997 |
| 6,547,022 B2 * | 4/2003 | Hosomi et al. ............. 180/197 | JP | 10024819 | 1/1998 |
| 6,553,284 B2 | 4/2003 | Holst et al. | JP | 10329682 | 12/1998 |
| 6,554,293 B1 | 4/2003 | Fennel et al. | JP | 11011272 | 1/1999 |
| 6,556,908 B1 | 4/2003 | Lu et al. | JP | 11170992 | 6/1999 |
| 6,559,634 B2 | 5/2003 | Yamada | JP | 11254992 | 9/1999 |
| 6,601,927 B2 * | 8/2003 | Sakamoto ............. 303/137 | JP | 11255093 | 9/1999 |
| 6,741,922 B2 * | 5/2004 | Holler ............. 701/71 | JP | 11304663 | 10/1999 |
| 7,040,722 B2 * | 5/2006 | Szabo et al. ............. 303/191 | JP | 11304662 | 11/1999 |
| 2001/0037677 A1 * | 11/2001 | Holst et al. ............. 73/121 | SU | 816849 | 3/1981 |
| 2002/0014799 A1 | 2/2002 | Nagae | | | |
| 2002/0040268 A1 | 4/2002 | Yamada et al. | | | |
| 2002/0056582 A1 | 5/2002 | Chubb | | | |
| 2002/0075139 A1 | 6/2002 | Yamamoto et al. | | | |
| 2002/0096003 A1 | 7/2002 | Yamada et al. | | | |
| 2002/0109310 A1 * | 8/2002 | Lim ............. 280/5.508 | | | |
| 2002/0139599 A1 | 10/2002 | Lu | | | |
| 2004/0119335 A1 * | 6/2004 | Szabo et al. ............. 303/147 | | | |

FOREIGN PATENT DOCUMENTS

| | | |
|---|---|---|
| DE | 38 15 938 | 11/1989 |
| DE | 43 21 571 | 1/1994 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

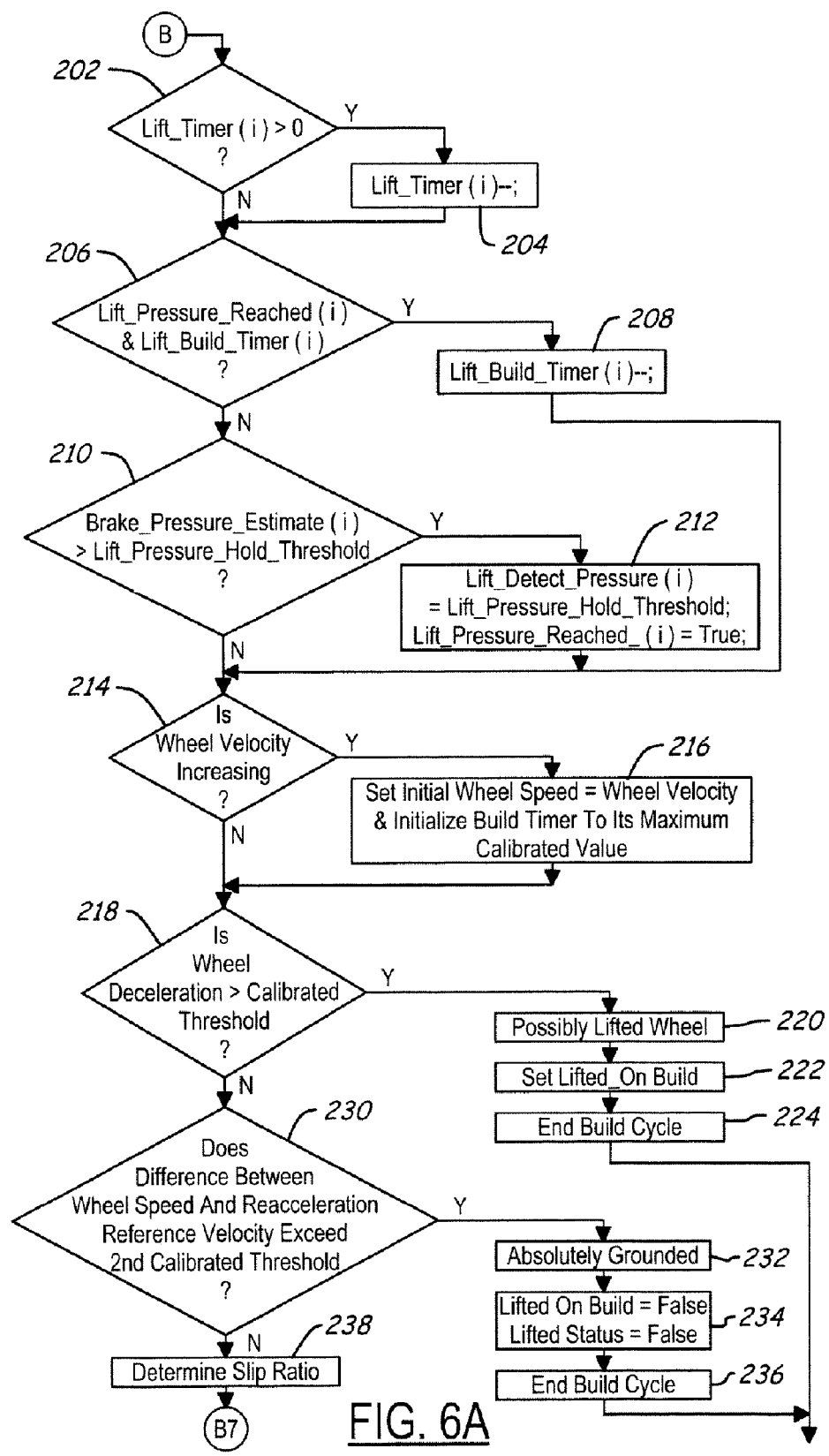

WHEEL LIFT IDENTIFICATION FOR AN AUTOMOTIVE VEHICLE

CROSS REFERENCE TO RELATED APPLICATIONS

The present application is a continuation-in part of U.S. application Ser. No. 10/608,909, filed Jun. 27, 2003, and provisional applications 60/401,309 filed Aug. 5, 2002, 60/400,156 filed Aug. 1, 2002, and 60/401,418 filed Aug. 5, 2002, which are incorporated by reference herein.

BACKGROUND OF INVENTION

The present invention relates generally to a dynamic behavior control apparatus for an automotive vehicle, and more specifically, to a method and apparatus for determining whether a wheel of an automotive vehicle has lifted from the pavement or become grounded after being lifted from the pavement.

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Typically, the dynamic control systems do not address roll of the vehicle. For high profile vehicles in particular, it would be desirable to control the rollover characteristics of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the body on a plane or nearly on a plane parallel to the road surface. Rollover control is used to maintain the vehicle wheels on the road surface.

Such systems typically use position sensors to measure the relative distance between the vehicle body and the vehicle suspension. One drawback to such systems is that the distance from the body to the road must be inferred.

It would therefore be desirable to provide a rollover detection system having reduced costs and increased reliability in predicting the occurrence of a rollover.

SUMMARY OF INVENTION

It is therefore one object of the invention to provide a lift detection system that may be used in conjunction with the dynamic stability control system of the vehicle to determine the presence of wheel lift and wheel grounded.

In one aspect of the invention, a method of controlling an automotive vehicle includes detecting a potential for a wheel lift, determining a wheel lift pressure request to determine wheel lift, generating a roll control pressure request, and suppressing the wheel lift pressure request in response to the roll control pressure request, when the wheel lift pressure would hinder or interfere with the delivery of the roll control pressure.

In a further aspect of the invention, a method of operating an automotive vehicle includes initiating a build cycle, storing a peak wheel speed after initiating the build cycle, determining a second wheel speed to determine a change in wheel speed from the peak speed, and determining a wheel lift status when the change in the wheel speed is greater than a predetermined value.

In yet another aspect of the invention, a method of operating an automotive vehicle having an antilock brake system includes initiating an antilock brake monitor mode and determining wheel lift in response to the antilock brake monitor mode.

One advantage of the invention is that in vehicles employing a dynamic stability control system, additional sensors may not be required.

Other objects and features of the present invention will become apparent when viewed in light of the detailed description of the preferred embodiment when taken in conjunction with the attached drawings and appended claims.

BRIEF DESCRIPTION OF DRAWINGS

FIGS. 6A and 6B are flow charts of one embodiment of a build cycle according to the present invention.

DETAILED DESCRIPTION

The present invention is described with respect to a wheel lift identification system for an automotive vehicle. Those skilled in the art will recognize that the present invention may be incorporated into a rollover prevention system for an automotive vehicle.

Figure 1:
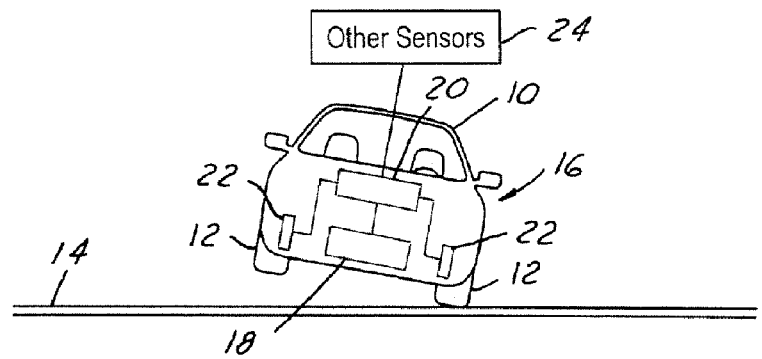
FIG. 1 is a partial cutaway view of an automotive vehicle having a wheel lift identification system according to the present invention.

Referring now to FIG. 1, an automotive vehicle 10 has a plurality of wheels 12, two of which are shown as elevated above a road plane 14. A roll control system 16 is included within vehicle 10. The roll control system 16 is used to counteract the lifting of wheels 12 from road plane 14 as will be further described below. Roll control system 16 includes a roll controller 18 that is preferably microprocessor based. Roll controller 18 may be part of a dynamic stability control system of the automotive vehicle 10. Roll controller 18 is coupled to a torque control system 20 that is used to control the torque of the wheels 12. Although torque control system 20 is illustrated as a separate item, torque control system 20 may be included in roll controller 18 which may in turn be included within a dynamic stability control system. Such a system may also have an antilock brake controller incorporated therein. Torque control system 20 may act in conjunction with the electronic engine controller, a driveline engagement mechanism or braking system, or a combination of these to control the torque at one or all of the wheels 12. Torque controller 20 and roll controller 18 may be coupled to wheel speed sensors 22 located at each of the wheels 12.

Wheel speed sensors 22 provide roll controller 18 with a signal indicative of the speed of the individual wheel to which it is attached. Various types of wheel speed sensors including toothed-wheel type systems would be evident to those skilled in the art.

Other sensors 24 may be coupled to roll control system 16. For example, roll angle sensors, steering wheel angle sensors, yaw rate sensors, and other sensors may be incorporated therein. Other sensors 24, as will be further described below, may be used to identify a condition suitable for the potential of wheel lift. Such a condition may initiate further action by roll control system 16 to verify wheel lift.

In the following example, the application of brake pressure is used to provide the change in torque. However, other methods such as applying engine torque may also be used to change the amount of torque at a wheel. Further references to the application of torque to a wheel may include hydraulic or electric brake torque, changes in engine torque or engagement of driveline torque through the use of an electronically controlled transfer case, differential, transmission or clutch. The present invention may also be used to determine if a sensor has failed in the roll control system 16. That is, if roll is suspected by a particular sensor, but all other conditions or sensors indicate otherwise, the sensor may be operating improperly. Also, although speed is used, wheel acceleration may also be used in place of speed as would be evident to those skilled in the art.

Figure 2:
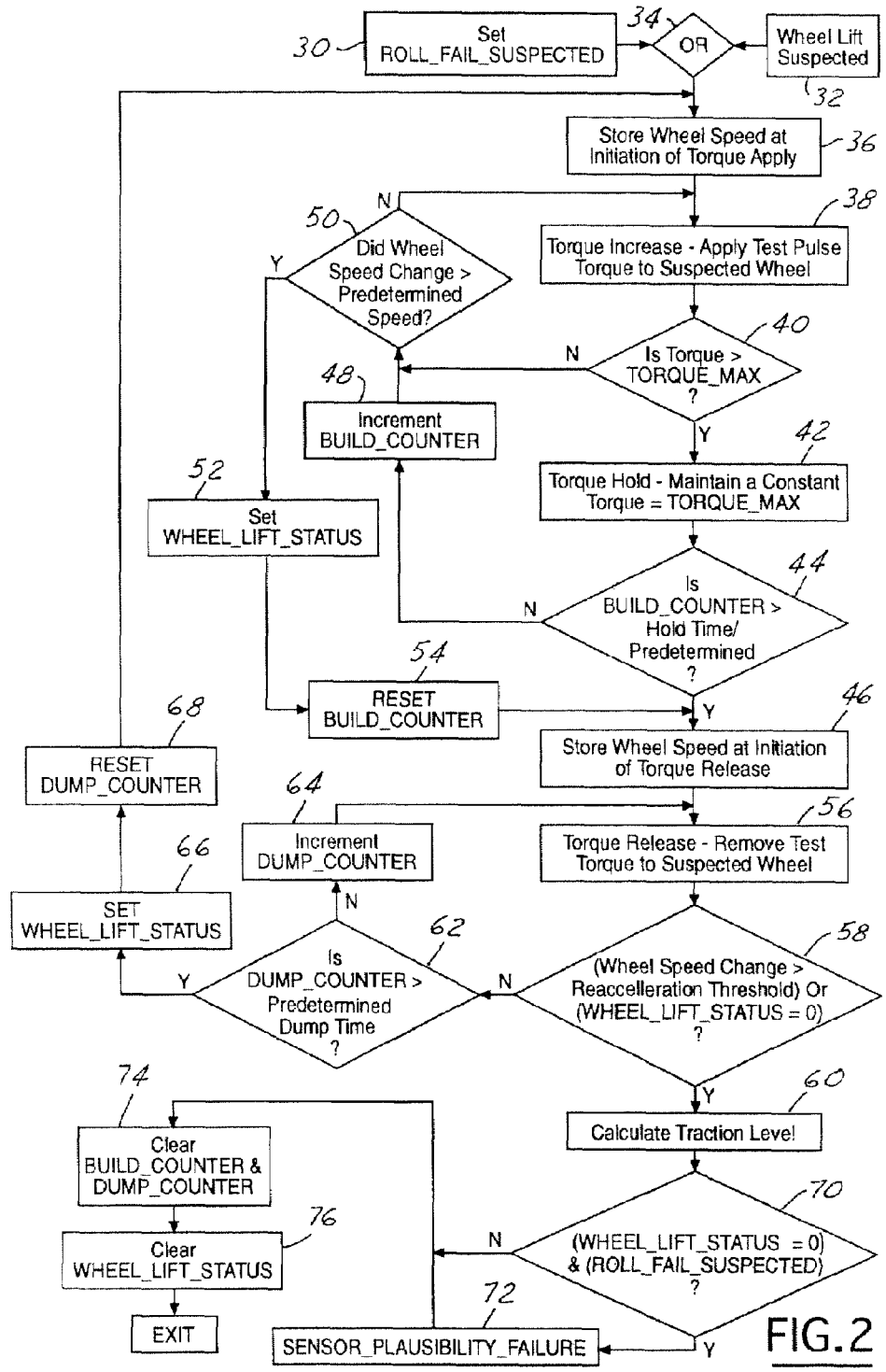
FIG. 2 is a flow chart of a wheel lift identification system according to the present invention.

Referring now to FIG. 2, in step 30, if a roll sensor failure is suspected or in step 32 if wheel lift is suspected by the roll control system 16, block 34 initiates the wheel lift determination process. In step 36, torque is applied to the wheel suspected of lifting and the wheel speed at the suspected wheel is stored. In step 38 the torque is increased by applying a test pulse of torque to the suspected wheel. Torque is applied until a torque threshold (Torque_Max) is achieved. In step 40, if the torque is greater than the Torque_Max, the torque is held constant in step 42. In step 44, if the time as counted by the Build_Counter is greater than a predetermined time, step 46 is executed in which the torque is released and the wheel speed at the initiation of the release of torque is stored. In step 44, if the counter is not greater than the predetermined hold time, the counter is incremented in step 48. After step 48 the change in wheel speed is compared to a predetermined change in wheel speed. If the wheel speed change is not greater than a predetermined speed in step 50, steps 38-44 are again executed. If the wheel speed change is greater than a predetermined speed, this indicates a lifted wheel. In this case, step 52 is executed in which a wheel lift status flag is set. After step 52, step 54 is executed in which the build counter is reset.

Referring back to step 40, if the torque is not greater than the torque threshold then step 50 is executed.

Referring back to step 46, after the wheel speed is recorded after the torque release, step 56 is executed. In step 56 torque is released. After step 56, step 58 is implemented in which the wheel speed change is compared to a reacceleration threshold. The reacceleration threshold is a predetermined value that corresponds to a wheel speed change that should be achieved should wheel contact be reestablished. The wheel speed change is determined from the time that the torque was released. If the wheel speed change is greater than a reacceleration threshold or if the wheel lift status from step 52 is zero, wheel contact is assumed. In such a case the traction level may be calculated in step 60. If the wheel speed does not increase over the reacceleration threshold, then the wheel lift status is confirmed beginning with step 70.

Referring back to step 58, if the wheel speed is less than the reacceleration threshold, step 62 compares the Dump_Counter to a predetermined dump time. If the predetermined dump time is greater than the Dump_Counter, then the Dump_Counter is incremented in step 64 and steps 56 and 58 are again executed. If the Dump_Counter is greater than the predetermined dump time, then the wheel lift status flag is set in step 66 and the Dump_Counter is reset in step 68. After step 68, the process is reinitiated and returns to step 36.

Returning back to step 60, the traction level is calculated in step 60. After step 60, the plausibility of a sensor failure is determined. If, for example, the process was initiated based on the suspicion of a sensor failure from block 30 above and no wheel lift was detected, a sensor failure is indicated in step 72. For either result, if a sensor failure is indicated by block 70 or not, the build counter and Dump_Counter are cleared in block 74 and the wheel lift status is cleared in block 76. The end of the routine occurs in block 78.

Thus, as can be seen, the application of torque can be used to first determine whether a suspected wheel has lifted from the pavement. For confirmation, the removal of the torque and the resulting wheel speed change may be used to confirm the initial finding. Advantageously, the system may be implemented in a dynamic stability system of an automotive vehicle without adding further sensors. If rollover is detected, then the rollover can be corrected by applying the brakes or generating a steering correction.

Figure 3A:
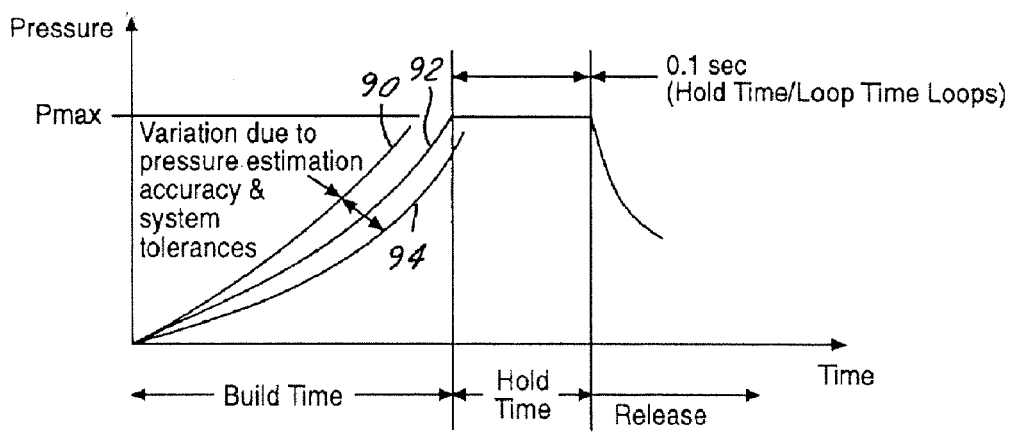
FIG. 3A is a plot of pressure versus time for a wheel lift identification system according to one embodiment of the present invention.

Referring now to FIG. 3A, various lines 90, 92, 94 are illustrated during the build time to illustrate the variation in pressure of the braking system due to wear and other effects of the brakes. Lines 90, 92, 94 have little effect on the overall operation of the system. Thus, the thresholds and parameters are selected so that the system is robust to wear and system variation. The maximum pressure $p_{max}$ is reached and maintained for a hold time (such as set forth in step 42 above) until it is released.

Figure 3B:
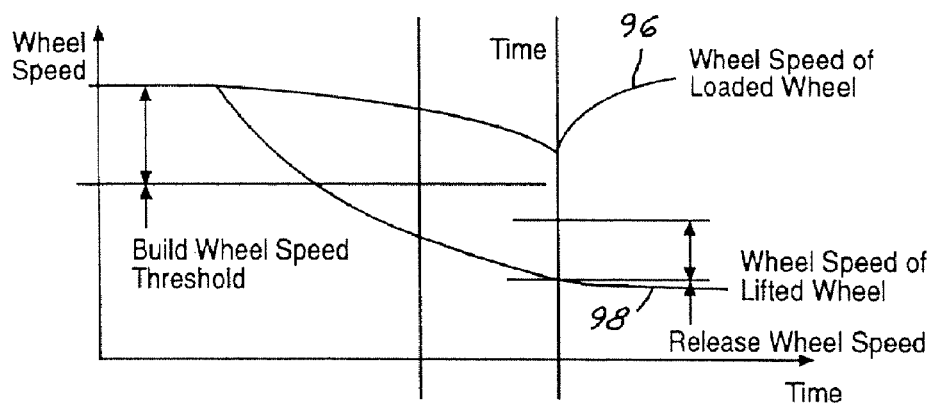
FIG. 3B is a plot of wheel speed versus time for a wheel lift identification system according to one embodiment of the present invention.

Referring now to FIG. 3B, a plot of wheel speed corresponding to the various times is illustrated. As shown, the wheel speed of a loaded wheel is illustrated by line 96, which is higher than the wheel speed of a lifted wheel illustrated by line 98.

Figure 4:
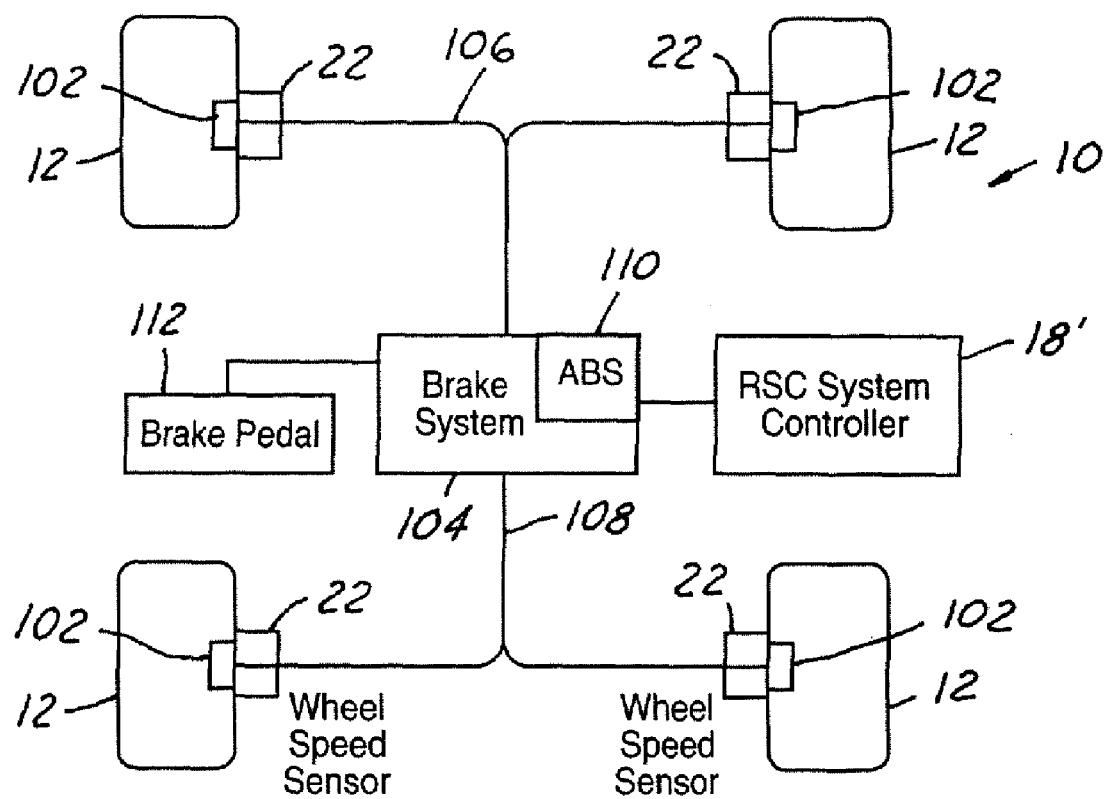
FIG. 4 is a schematic view of a vehicle having a braking system.

Referring now to FIG. 4, automotive vehicle 10 includes wheel speed sensors 22 that are coupled at each wheel 12. Each wheel also has brakes 102 that are hydraulically coupled to a brake system 104 through hydraulic lines 106 and 108. Hydraulic lines 106 are coupled to the front brakes and form a front brake circuit and hydraulic lines 108 are coupled to the rear brakes forming a rear brake circuit. Many vehicles are manufactured in such a configuration in which the front wheels and rear wheels are on different brake circuits. Brake system 104 may include an anti-lock brake system controller 110. The anti-lock brake system controller 110 is known in the art. The anti-lock brake system controller 110 may be an integral part of brake system 104 or a separate component. The anti-lock brake system controller 110 builds pressure in the wheels and in response thereto prevents the wheel from locking by releasing the brake pressure thereto.

A rollover stability control system controller 18" is coupled to brake system 104. The rollover stability control system controller 18" may command brake system 104 to provide hydraulic pressure to a front wheel (or rear wheel) to prevent the vehicle from rolling over.

It is desirable to allow the roll stability control system to have the full capacity of the hydraulic brake actuation system during severe roll maneuvers. As described above, the wheel lift detection system may apply brakes to change the torque in a tire to detect whether a wheel is lifted. In the first embodiment of the invention, the wheel lift pressure request is suppressed on a wheel when there is a large pressure requested on the other wheel of the same hydraulic circuit. That is, when a large roll control pressure request is generated for the same hydraulic circuit, it is desirable to suppress the wheel lift pressure request.

A brake pedal 112 is also coupled to brake system 104. Brake pedal 112 provides the system with an indication as to the amount of brake pressure desired by the vehicle operator.

Figure 5A:
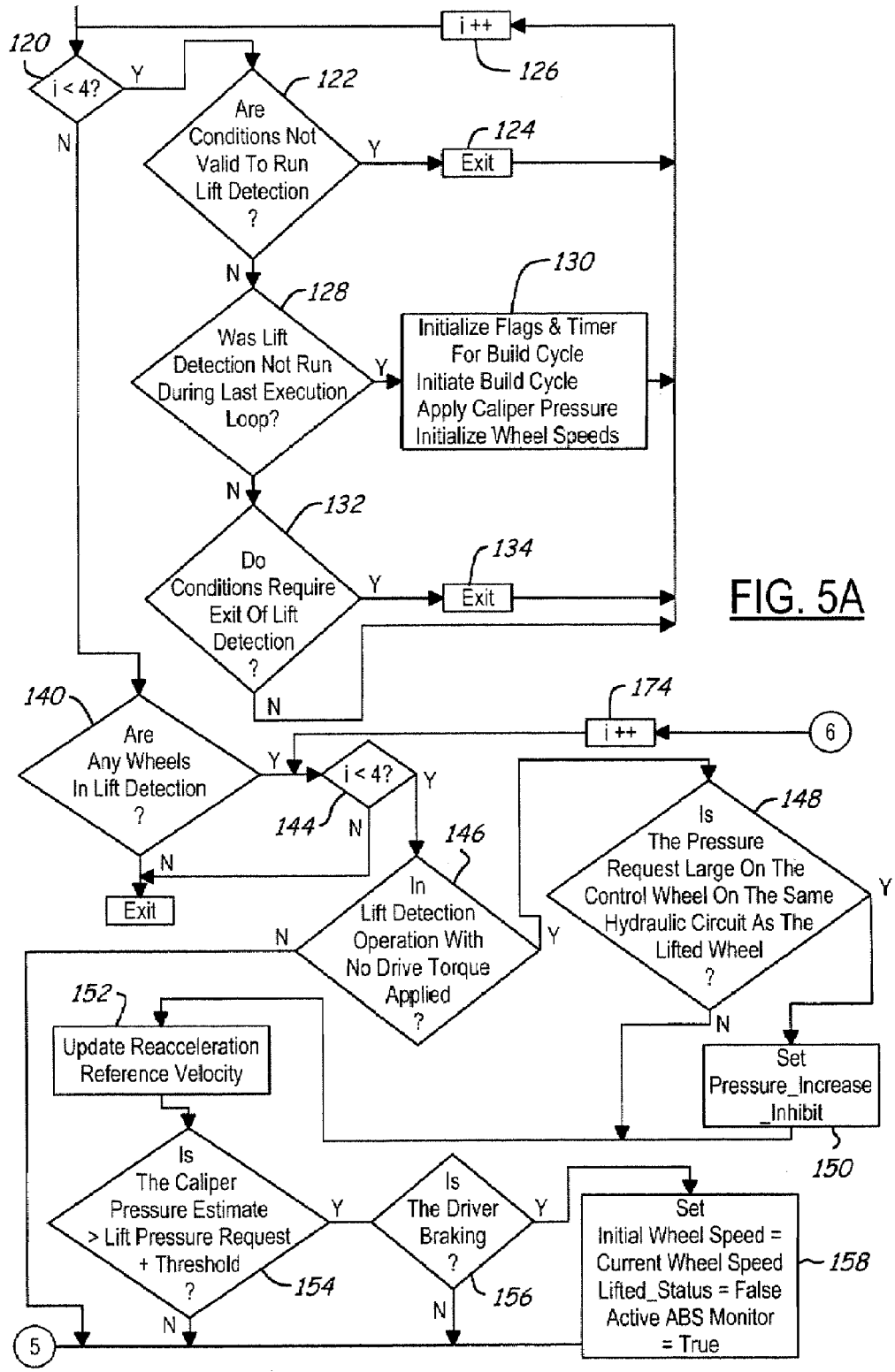
FIGS. 5A and 5B are high level flow charts of one embodiment of active wheel lift detection according to the present invention.
Figure 5B:
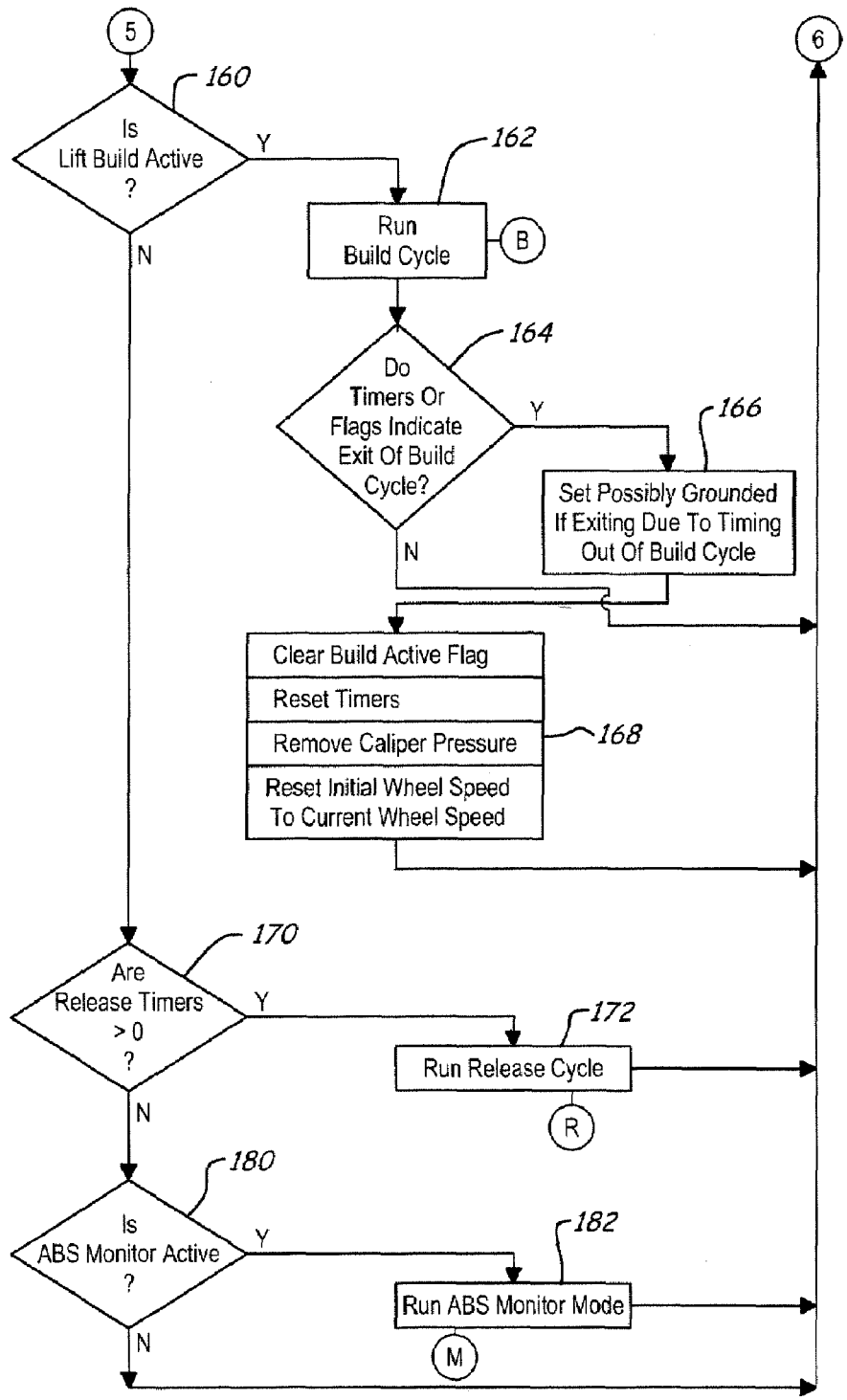

Referring now to FIGS. 5A and 5B, in step 120 i is an array index that refers to each of the wheels of the vehicle. That is, each of the wheels of the vehicle is labeled 0 through 3 (LF, RF, LR, RR, respectively). The following method may be run simultaneously or sequentially on each of the wheels of the vehicle to determine whether the wheels have lifted. In the present example, the determination of whether a wheel has lifted is performed sequentially. i is initially 0 and is incremented in the following method. In step 120 if i is less than 4, step 122 is executed. In step 122 whether or not to run wheel lift detection is determined. As described above, the lift suspected flag is generated from the various sensors when the dynamics indicate that a wheel lift may be impending. In step 122, if the conditions are not met to run lift detection, step 124 is executed in which the wheel lift operation is exited for that wheel. In step 126 a counter is incremented to proceed to the next wheel.

Referring back to step 122, if the conditions are not valid (valid), step 128 is executed. In step 128 if lift detection was not run during the last loop step 130 initializes the system for a build cycle. To initialize the system the flags and timers are initialized, caliper pressure is applied, and the wheel speeds are initialized. The system returns to step 126 after step 130. In step 128 if the lift detection was run during the last execution loop, step 132 is executed. In step 132 if the conditions require exit of lift detection in step 132, step 134 is executed after which step 126 is executed. In step 132 if the conditions do not require exit of the lift condition, step 126 is executed without the exit process, so wheel lift will continue on that wheel in the next execution.

Referring back to step 120, if the wheel lift detection is run for each of the wheels (where i=4) step 140 is executed in which the wheels are determined if they are in a lift detection mode. If no wheels are in a lift detection mode step 142 is executed in which the system is exited. In step 140 if any of the wheels are in lift detection mode the counter i is checked in step 144. If the counter is not less than 4, step 142 is executed. If the counter is less than 4, step 146 is executed. In step 146 if the system is in a lift detection operation with no drive torque applied, step 148 is executed. In step 148 it is determined if the pressure request is large on the control wheel that is on the same hydraulic circuit as a lifted wheel. If this is the case, step 150 is executed in which the wheel lift pressure increase is inhibited for that wheel. That is, if the roll control system is trying to prevent rollover, the wheel lift pressure request is suppressed if a roll control pressure request is applied to a wheel on the same hydraulic circuit. When the request drops below a second threshold the wheel lift pressure request suppression may be discontinued. The suppression may also be discontinued during a stable roll motion.

Referring back to step 148, if the pressure request on the control wheel is not large on the same hydraulic circuit or the pressure increase is inhibited in step 150, step 152 is executed in which the reacceleration reference velocity is updated. The reacceleration reference velocity is the wheel speed variable that is monitored throughout the entire execution of the wheel lift detection algorithm. It is equated to the wheel speed during deceleration. When the wheel speed increases, the reacceleration reference velocity is increased at a fixed rate that represents the minimum wheel acceleration that represents contact with the ground. Separate thresholds are used to compare the wheel acceleration to the reacceleration reference velocity during the build and release cycles. In step 154 if the caliper pressure estimate is greater than the lift pressure request plus the threshold in step 154 and in step 156 if the driver is braking, step 158 is executed in which the initial wheel speed is set to the current wheel speed, the wheel lifted status is set to false and the ABS monitor active is set to true.

Referring back to steps 146, 154, 156, and 158, if in step 146 the system is not in a lift detection operation with no drive torque applied, or in step 154 if the caliper pressure estimate is not greater than the lift pressure request plus the threshold, or the driver is not braking in step 156, or after step 154, the system continues in step 160 to determine whether or not the lift build is active. If the lift build is active the build cycle is run in step 162. The build cycle will be further described below. After the build cycle is run, step 164 is executed in which the timers or flags are checked. If the timers or flags indicate an exit of a build cycle in step 164, step 166 is executed in which the possibly grounded flag is set if the exiting is due to the timing out of the build cycle. After 166, step 168 is executed in which the build active flag is cleared, the timers are reset, the caliper pressure is removed and the initial wheel speed is set to the current wheel speed. In step 164 if the timers or flags do not indicate exit of the build cycle the wheel index is incremented in step 174 to run step 144 on the next wheel. If the lift build is not active in step 160, step 170 is executed in which the release timers are checked. If the release timers are greater than 0 the release cycle is executed in step 172. The release cycle will be further described below. After step 172 step 174 is executed which increments the wheel counter. After step 174, step 144 is executed. Referring back to step 170, if the release timers are not greater than 0 the system determines whether or not the ABS monitor flag is active in step 180. In step 180 if the monitor flag is active the ABS monitor mode is run in step 182. After the ABS monitor is run step 174 is executed. In step 180 if the ABS monitor mode is not active the system step 174 is executed.

Figure 6B:
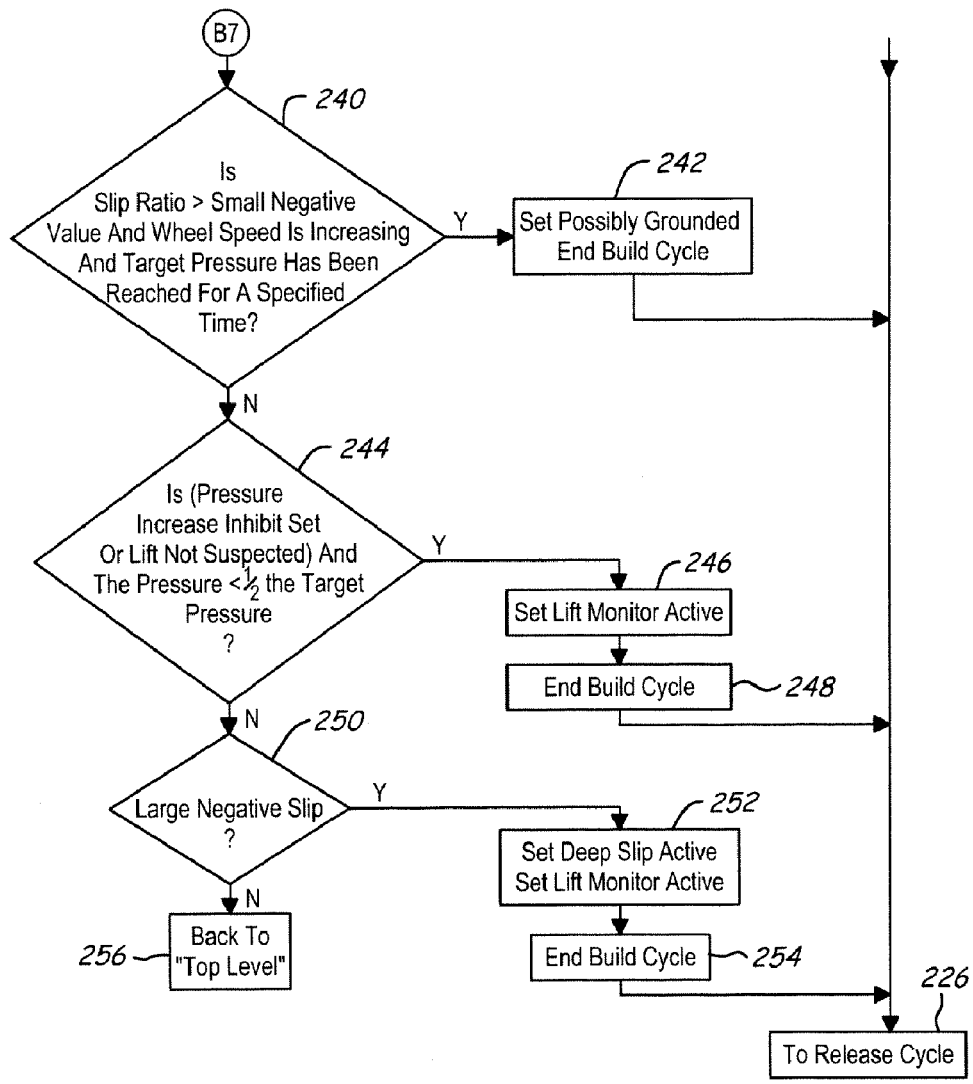

Referring now to FIGS. 6A and 6B, the build cycle from step 162 is described in further detail. A lift timer is decremented for each wheel while it is running in the build cycle. In step 202 the lift timer for the wheel, if it is greater than 0, is decremented in step 204. If the lift timer is not greater than 0, step 206 is executed. If the lift pressure has been reached and is operating, step 208 is executed in which the build timer is again decremented. The Lift_Build_Timer monitors the length of time that the lift build pressure has been applied.

Referring back to step 206, if the lift build pressure is not reached or the lift build timer is equal to zero, step 210 is performed. In step 210 if the brake pressure estimate is greater than the lift pressure hold threshold then step 212 is executed in which the lift detect pressure is set to the lift pressure threshold and the lift pressure reached flag is set to true. After step 212 and after step 208, or if the conditions in step 210 are not met, step 214 is executed in which it is determined whether or not the wheel velocity is increasing. If the wheel velocity is increasing step 216 is executed in which the initial wheel speed is set to the wheel velocity and the initialized build timer is set to its maximum calibrated value. This allows the system to capture the maximum or peak wheel speed since the wheel speed may continue to rise for a short amount of time after the build cycle is initiated.

Referring back to step 214, if the wheel velocity is not increasing, step 218 is executed in which the wheel deceleration is compared to a calibrated threshold. This may also be performed by determining a drop in wheel speed from the initial wheel speed and comparing it to a threshold. If the wheel deceleration (or drop in wheel speed) is greater than the calibrated threshold a possibly lifted wheel flag is set in step 220, the lifted on build flag is set in step 222, and in step 224 the end build cycle is performed. After step 224, step 226 is executed in which the release cycle is entered. The release cycle will be further described below.

Referring back to step 218, if the wheel deceleration is not greater than the calibrated threshold step 230 is executed in which the difference between the wheel speed and reacceleration reference velocity is compared to a second calibrated threshold. If the difference between the wheel speed and the reacceleration reference velocity does exceed a second calibrated threshold, an absolutely grounded flag is set in step 232, a lift_on_build signal is set to false in step 234. In step 234 the lifted status flag is also set to false and the build cycle is ended in step 236. After step 236 the release cycle is entered in step 226.

Referring back to step 230, if the difference between the wheel speed and reacceleration is not exceeding a second threshold, step 238 is executed. In step 238 the slip ratio of the wheel is determined. In step 240, if the slip ratio is greater than a small negative value and the wheel speed is increasing and the target pressure has been reached for a specific time, step 242 is executed in which a possibly grounded flag is set and the build cycle is ended. After step 242, step 226 is executed in which the release cycle is performed.

Referring back to step 240, if the slip ratio is not greater than a small negative value or the wheel speed is not increasing or the target pressure has not been reached for a specific time, step 244 is executed. In step 244 if the pressure increase inhibit is set or the lift not suspected flag is set and the pressure is less than half the target pressure, step 246 is executed in which the lift monitor flag is set to be active and the build cycle ends in step 248. After step 148, step 226 enters the release cycle.

Referring back to step 244, if the target pressure is not less than half the target pressure or the pressure increase inhibit is set or the lift not suspected flag is set, then step 250 is executed in which the slip is determined. If there is a large negative slip step 252 is executed in which the deep slip active flag is set and a lift monitor active flag is set. Thereafter, step 254 ends the build cycle and the release cycle is entered in step 226. In step 250 if there are no large negative slips step 256 is executed in which the system returns to step 126 of FIG. 5A.

Figure 7A:
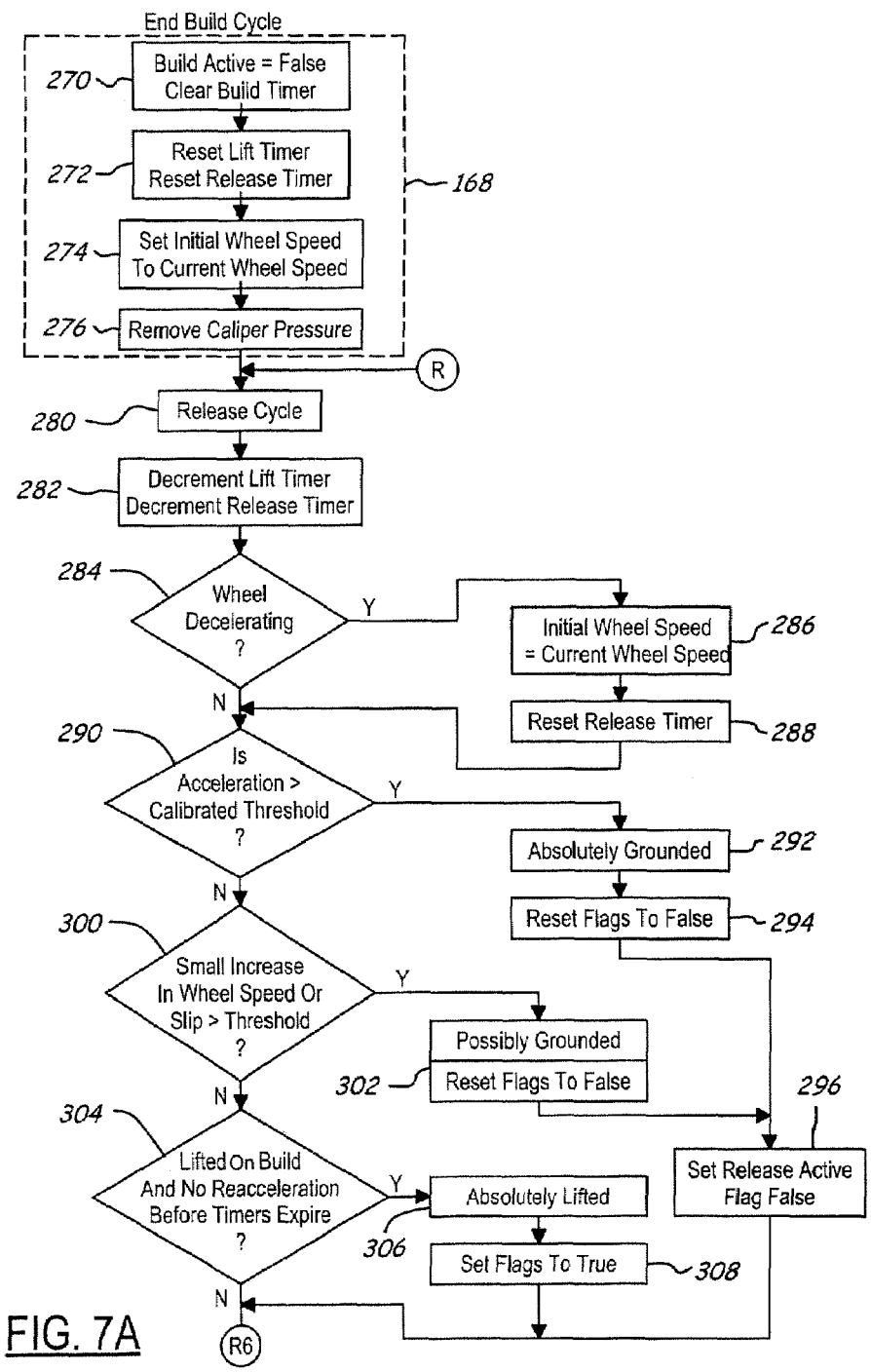
FIGS. 7A and 7B are flow charts of one embodiment of a release cycle according to the present invention.
Figure 7B:
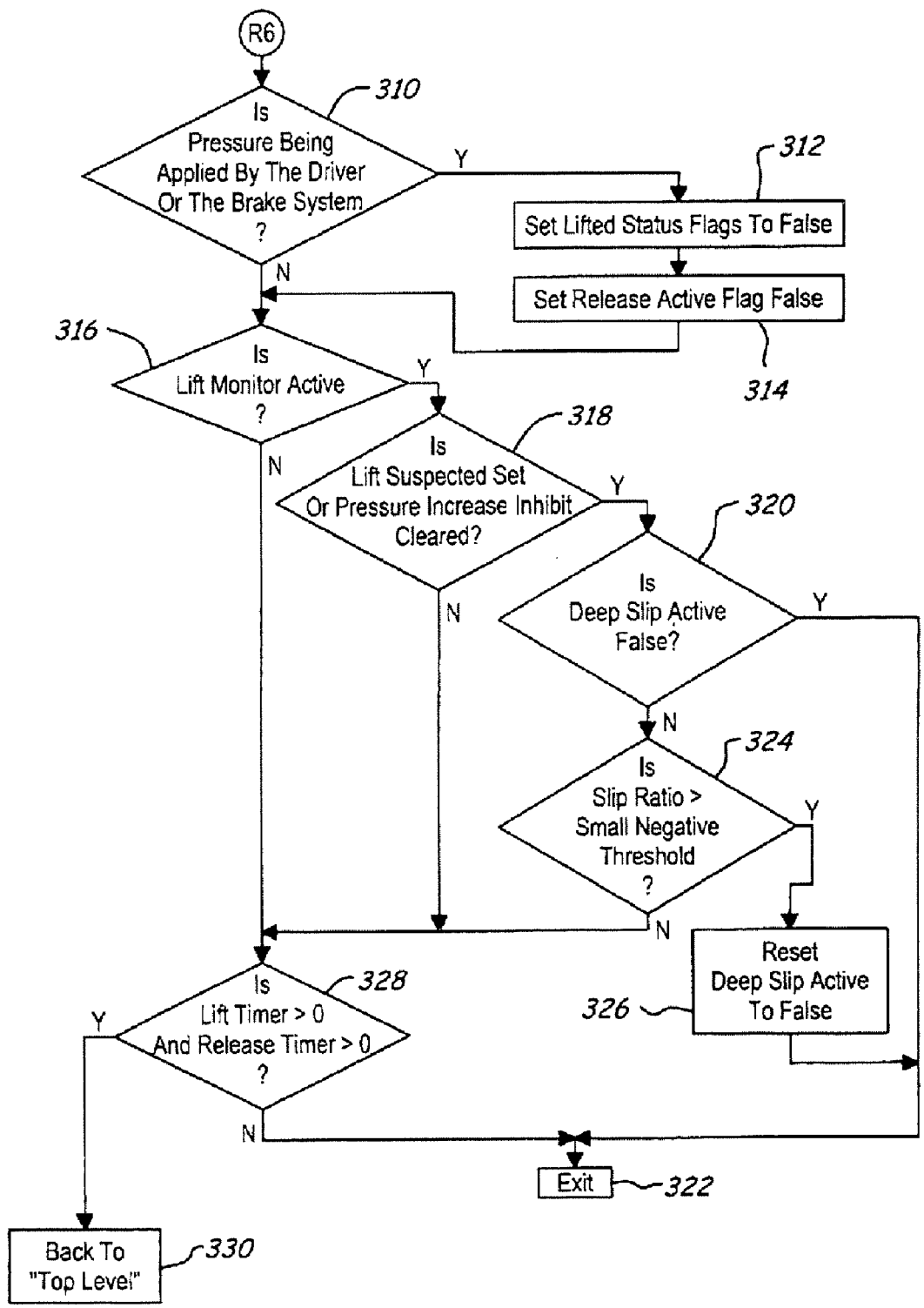

Referring now to FIG. 7A the release cycle is described in further detail. In step 270 the build active flag is set to false and the build timer is cleared. In step 272 the lift timer is reset and the release timer is also reset. In step 274 the initial wheel speed is set to the current wheel speed. In step 276 the caliper pressure is removed. It should be noted that steps 270-276 may correspond to step 168 and may only be run once in the first execution of a given period of successive operations of the release cycle. Steps 270-276 are run for each instance of End Build Cycle in FIGS. 6A and 6B (Step 224, 236, 242, 248 and 254). The release cycle is started in step 280. In step 282 the lift timer is decremented and the release timer is also decremented. In step 284 it is determined whether the wheel is decelerating. If the wheel is decelerating the initial wheel speed is set to the current wheel speed in step 286 and the release timer is reset in step 288. In step 284 if the wheel is not decelerating and after step 288, step 290 is executed in which the wheel acceleration is compared to a calibration threshold. The wheel acceleration may also be determined as the difference between the wheel speed and reacceleration reference velocity. If the acceleration is greater than a calibration threshold, step 292 is executed in which an absolutely grounded flag is set. In step 294 the flags are reset to false. After step 294 step 296 is executed in which the release active flag is set to false.

Referring back to step 290, if the acceleration is not greater than a calibrated threshold then step 300 is executed. In step 300 if there is a small increase in wheel speed or the slip is greater than a threshold step 302 is executed in which a possibly grounded flag is set and the reset flag is set to false. After step 302, step 296 is executed.

Referring back to step 300, if there is not a small increase in wheel speed or the slip is not greater than a threshold, step 304 is executed. In step 304 it is determined whether the system has lifted_on_build (during the build cycle) and the timer has expired. In step 304 if the system was determined to be lifted_on_build and no reacceleration was performed before the timer expired, step 306 is executed in which the absolutely lifted flag is executed and the and the flags are set to true in step 308.

Referring back to step 304 and after step 296, step 310 is executed. In step 310 if there is pressure being applied by the driver or the brake system, step 312 is executed in which the lifted status flags are set to false and the release active flags are set to false in step 314. In step 310 if there is no pressure being applied by the driver of the brake system or after step 314, step 316 is executed. In step 316 if the lift monitor is active step 318 is executed. In step 318 if the lift suspected flag is set or the pressure increase inhibit is cleared, step 320 is executed in which it is determined whether the deep slip active is false. If the deep slip active flag is false, then step 322 exits the system.

Referring back to step 320 if the deep slip active is not false step 324 is executed in which if the deep slip ratio is greater than a small negative threshold then step 326 is executed in which the deep slip active flag is reset to false. The system continues in step 322. In step 324 if the slip ratio is not greater than a small negative threshold or in step 318 if the lift suspected flag is not set or the pressure increase inhibit is not cleared or in step 316 if the lift monitor flag is not active, step 328 is executed. In step 328 if the lift timer is greater than 0 and the release timer is greater than 0 the system returns back to step 174 in FIG. 5A through step 330. If the lift timer is not greater than 0 and the release timer is not greater than 0 then step 322 is executed.

Figure 8:
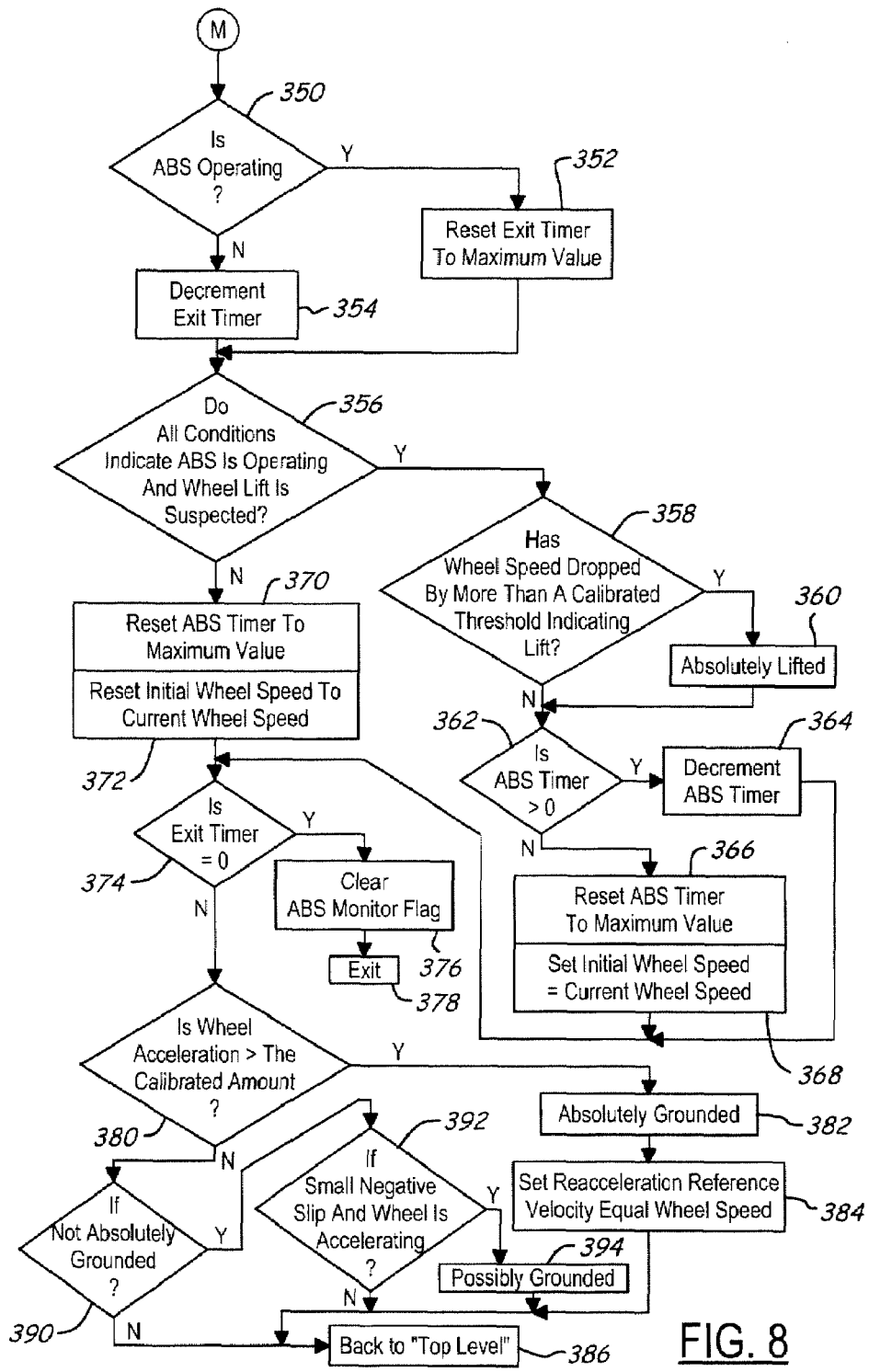
FIG. 8 is a high level flow chart of an ABS monitor mode according to the present invention.

FIG. 8 describes the ABS Monitor mode operation. At the beginning of each cycle of the wheel lift detection routine, driver braking or the caliper pressure larger than a wheel lift request are checked, in steps 154 and 156 of FIG. 5A. If the brake pressure is caused by driver braking, an ABS monitor mode is initiated if it is already not running. Referring back to FIG. 8, step 350 is executed in which it is determined whether or not the ABS is operating. In step 350 if the ABS is operating, step 352 is executed in which an exit timer is set to a maximum value. The ABS timer is reset to its maximum value as long as ABS is active. If the ABS is not operating an exit timer is decremented in step 354. The ABS timer is decremented to cause an exit from ABS monitor mode at a fixed period of time after the end of ABS operation. The pressure from the drivers braking is used as the pressure build in ABS monitor mode. If the wheel is lifted the driver braking will cause a slip ratio that will result in an ABS pressure release. However, the wheel will continue to decelerate as long as it is off the ground. After steps 354 and 352 step 356 is executed in which the conditions are checked to determine whether ABS is operating and whether wheel lift is suspected. In step 356 if all the conditions indicate ABS is operating and a wheel lift is suspected step 358 is executed. In step 358 if the wheel speed has dropped by more than a calibrated threshold indicating wheel lift an absolutely lifted flag is set in step 360. In step 358 if the conditions are not true then step 362 is executed in which it is determined whether the ABS timer is greater than 0. If the ABS timer is greater than 0 step 364 is executed. The ABS timer is then decremented.

Referring back to step 362 if the ABS timer is not greater than 0 the ABS timer is reset to a maximum value in step 366 and the initial wheel speed is set to the current wheel speed in step 368.

Referring back to step 356, if all the conditions indicate ABS is not operating or wheel lift is not suspected step 370 is executed. In step 370 the ABS timer is set to a maximum value and in step 372 the initial wheel speed is set to the current wheel speed. After steps 364, 368, and 372, step 374 is executed in which the exit timer is compared to 0. If the exit timer is 0, step 376 is executed in which the ABS monitor flag is cleared and the system exits in step 378. In step 374 if the exit timer is not 0 then the wheel acceleration is compared to the calibration amount. The wheel acceleration may be the wheel velocity increasing above a reacceleration reference velocity by more than a calibrated amount. In step 380 if the wheel acceleration is greater than the acceleration amount then an absolutely grounded flag is set in step 382 and the reacceleration reference velocity is set equal to the wheel speed in step 384. After step 384 the system returns back to the top level in step 386. That is, the system returns to step 174 of FIG. 5A.

Referring back to step 380, if the wheel acceleration is not greater than the calibration amount step 390 is executed. In step 390 if the absolutely grounded flag is not set for that wheel, step 392 is executed. In step 392 if a small negative slip is present and the wheel is accelerating step 394 generates a possibly grounded flag. In step 392 if a small negative slip ratio is not present or the wheel is not accelerating step 386 is executed.

While particular embodiments of the invention have been shown and described, numerous variations alternate embodiments will occur to those skilled in the art. Accordingly, it is intended that the invention be limited only in terms of the appended claims.

The invention claimed is:

1. A method of operating an automotive vehicle comprising:
   initiating a build cycle;
   storing a peak wheel speed after initiating the build cycle;
   determining a second wheel speed to determine a change in wheel speed from the peak speed;
   determining a slip ratio in response to an applied torque; and
   determining a wheel lift status when the change in the wheel speed is greater than a predetermined value, and in response to said slip ratio, wherein each of the steps are performed with respect to a single wheel of the vehicle.

2. A method as recited in claim 1 further comprising ending a build cycle in response to said slip ratio being negative.

3. A method as recited in claim 1 wherein determining a wheel lift status comprises determining a first or second wheel lift status.

4. A method of operating an automotive vehicle comprising:
   initiating a build cycle;
   storing a peak wheel speed after initiating the build cycle;
   determining a second wheel speed to determine a change in wheel speed from the peak speed; and
   choosing between a first or second lift status in response to the change in wheel speed and a reacceleration threshold, wherein each of the steps are performed with respect to a single wheel of the vehicle.

5. A method as recited in claim 4 wherein the first wheel lift status comprises grounded and the second wheel lift status comprises lifted.

6. A method as recited in claim 4 wherein the first wheel lift status comprises absolutely grounded and the second wheel lift status comprises absolutely lifted.

7. A method as recited in claim 4 wherein choosing comprises choosing between a first, second third or fourth status in response to the change in wheel speed.

8. A method as recited in claim 4 wherein the first wheel lift status comprises absolutely grounded, the second wheel lift status comprises absolutely lifted, and a third wheel lift status comprises possibly grounded and possibly lifted.

9. A method as recited in claim 4 further comprising determining wheel slip, wherein choosing comprises choosing between a first or second wheel lift status in response to the change in wheel speed and wheel slip.

10. A method as recited in claim 4 wherein wheel slip comprises wheel slip ratio.

11. A method as recited in claim 4 wherein the reacceleration threshold comprises a reacceleration reference velocity.

12. A method of operating an automotive vehicle comprising:
    initiating a build cycle;
    storing a peak wheel speed after initiating the build cycle;
    determining a second wheel speed to determine a change in wheel speed from the peak speed; and
    choosing between a first or second lift status in response to the change in wheel speed and a reacceleration threshold, the reacceleration threshold comprising a reacceleration reference velocity, and
    when the wheel speed is decelerating, selling the reacceleration reference velocity to the wheel speed.

13. A method of operating an automotive vehicle comprising:
    initiating a build cycle;
    storing a peak wheel speed after initiating the build cycle;
    determining a second wheel speed to determine a change in wheel speed from the peak speed; and
    choosing between a first or second lift status in response to the change in wheel speed and a reacceleration threshold, the reacceleration threshold comprising a reacceleration reference velocity, and
    when the wheel speed is accelerating, increasing the reacceleration reference velocity.

14. A method as recited in claim 13 wherein increasing the reference velocity comprises increasing the reference velocity at a predetermined rate.

15. A method as recited in claim 14 wherein the predetermined rate corresponds to a minimum wheel acceleration representing contact with the ground.

16. A method of controlling an automotive vehicle comprising:
    initiating a build cycle;
    determining a slip ratio in response to an applied torque;
    ending said build cycle in response to said slip ratio being negative;
    after the build cycle, initiating a release cycle; and
    determining one of possibly grounded condition, or possibly lifted condition during one of the build cycle or the release cycle, wherein each of the steps are performed with respect to a single wheel of the vehicle.

17. A method of operating an automotive vehicle having an antilock brake system and a roll control system comprising:
    initiating an antilock brake monitor mode by the vehicle antilock brake system when the roll control system suspects lift and the driver is braking above a minimum pressure level;
    determining a slip ratio in response to an applied torque; and
    determining wheel lift in response to said slip ratio and the level of wheel deceleration generated while the pressure is being released in the antilock brake monitor mode.

18. A method as recited in claim 17 wherein determining wheel lift comprises determining a absolutely lifted, possibly grounded condition or absolutely grounded in response to the antilock brake monitor mode.

19. A method of controlling an automotive vehicle comprising:
    initiating an antilock brake monitor mode having a release cycle;
    determining a change in wheel speed;
    determining a wheel slip; and
    determining a wheel lift or wheel grounded condition in response to the change in wheel speed, a reacceleration threshold and wheel slip, wherein each of the steps are performed with respect to a single wheel of the vehicle.

20. A method as recited in claim 19 wherein determining wheel lift comprises determining a absolutely lifted, possibly grounded condition or absolutely grounded in response to the antilock brake monitor mode.

* * * * *